United States Patent
Slutsky et al.

(10) Patent No.: US 8,833,660 B1
(45) Date of Patent: Sep. 16, 2014

(54) CONVERTING A DATA STREAM FORMAT IN AN APPARATUS FOR AND METHOD OF READING TARGETS BY IMAGE CAPTURE

(71) Applicant: Symbol Technologies, Inc., Schaumburg, IL (US)

(72) Inventors: Michael S. Slutsky, Stony Brook, NY (US); James R. Giebel, Centerport, NY (US); William C. Sackett, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/903,381

(22) Filed: May 28, 2013

(51) Int. Cl.
| | |
|---|---|
| *G06K 7/10* | (2006.01) |
| *G02B 26/10* | (2006.01) |
| *G06K 9/22* | (2006.01) |
| *G06K 19/06* | (2006.01) |
| *G06K 7/14* | (2006.01) |

(52) U.S. Cl.
CPC ..................................... *G06K 7/146* (2013.01)
USPC .................. 235/462.25; 235/454; 235/462.45

(58) Field of Classification Search
CPC . G06K 7/10722; G06K 15/1878; G06K 9/22; G06K 19/06; G06T 2207/10008; G06T 2207/10024; G06T 7/408; H04N 1/40012; H04N 9/64
USPC .................. 235/454, 462.01, 462.25, 462.45, 235/472.01
See application file for complete search history.

(56) References Cited

U.S. PATENT DOCUMENTS

| | | | | |
|---|---|---|---|---|
| 4,924,413 | A | * | 5/1990 | Suwannukul ................. 345/603 |
| 5,572,599 | A | * | 11/1996 | Tse .............................. 382/162 |
| 7,688,334 | B2 | | 3/2010 | Li |
| 8,253,998 | B2 | * | 8/2012 | Tsurui ........................... 358/505 |
| 8,305,456 | B1 | | 11/2012 | McMahon |
| 8,659,790 | B2 | * | 2/2014 | Tsuzuki ......................... 358/1.9 |
| 2002/0051227 | A1 | * | 5/2002 | Hirai et al. ..................... 358/444 |
| 2003/0161016 | A1 | * | 8/2003 | Abhyankar et al. .......... 358/539 |
| 2004/0156076 | A1 | * | 8/2004 | Togami et al. ................. 358/2.1 |
| 2004/0257621 | A1 | * | 12/2004 | Ishihara ......................... 358/2.1 |
| 2009/0073516 | A1 | * | 3/2009 | Tanaka .......................... 358/505 |
| 2010/0118344 | A1 | * | 5/2010 | Asano .......................... 358/1.15 |
| 2011/0096985 | A1 | | 4/2011 | Matsuhira |
| 2012/0117441 | A1 | * | 5/2012 | Hansen et al. ................ 714/752 |
| 2012/0121209 | A1 | * | 5/2012 | Li et al. ........................ 382/307 |

FOREIGN PATENT DOCUMENTS

| | | |
|---|---|---|
| EP | 1519564 A1 | 3/2005 |
| EP | 2091225 A2 | 8/2009 |

* cited by examiner

*Primary Examiner* — Tuyen K Vo
(74) *Attorney, Agent, or Firm* — Nong-Qiang Fan (57) ABSTRACT

An apparatus and method read a target by capturing return light from the target with a solid-state monochrome imager operative for generating an output data stream in a monochrome format having a plurality of slots containing pixel data indicative of an image of the target, and with a color controller for receiving the output data stream in a color format different from the monochrome format. A converter circuit converts the monochrome format into the color format and includes an input formatter for formatting the output data stream to have additional slots, a buffer for receiving auxiliary pixel data related to the image of the target, and an output formatter for inserting the auxiliary pixel data from the buffer into the additional slots and for processing both the pixel data and the auxiliary pixel data to enhance the reading of the target.

20 Claims, 5 Drawing Sheets

OUTPUT DATA STREAM IN COLOR FORMAT

| Cr1 | Y1 | Cb2 | Y2 | Cr3 | Y3 | Cb4 | Y4 | ... | ... | Cr639 | Y639 | Cb640 | Y640 |

SLOT 1, SLOT 2, SLOT 3, SLOT 4, SLOT 5, SLOT 6, SLOT 7, SLOT 8

FIG. 5

CONVERTING A DATA STREAM FORMAT IN AN APPARATUS FOR AND METHOD OF READING TARGETS BY IMAGE CAPTURE

FIELD OF THE DISCLOSURE

The present disclosure relates generally to an apparatus for, and a method of, reading targets by image capture and, more particularly, to converting a monochrome format of an output data stream from a monochrome imager to a color format required by a color controller to enhance and optimize reading performance.

BACKGROUND

Solid-state imaging systems or imaging readers have been used, in both handheld and/or hands-free modes of operation, to electro-optically read symbol targets, such as one- and/or two-dimensional bar code symbols, each bearing elements, e.g., bars and spaces, of different widths and reflectivities, to be decoded, as well as other targets, such as forms, documents, labels, receipts, signatures, drivers' licenses, identification badges, payment/loyalty cards, and the like, each bearing one or more form fields, typically containing alphanumeric characters, images, or bar code symbols.

A known exemplary imaging reader includes a housing, either held by a user in the handheld mode, or supported on a support, such as a stand, a cradle, a docking station, or a support surface, in the hands-free mode; a window supported by the housing and aimed at the target; and a scan engine or module supported by the housing and having a solid-state imager (or image sensor or camera) with a sensor array of photocells or light sensors (also known as pixels), and an imaging lens assembly for capturing return light scattered and/or reflected from the target being imaged along an imaging axis through the window over a field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or characters or marks indicative of text in a form field of a form, or into a picture indicative of a picture on the form.

A trigger is typically manually activated by the user to initiate reading in the handheld mode of operation. In the hands-free mode, the user may slide or swipe the target past the window in either horizontal and/or vertical and/or diagonal directions in a "swipe" mode. Alternatively, the user may present the target to an approximate central region of the window in a "presentation" mode. The choice depends on the type of target, operator preference, or on the layout of a workstation in which the reader is used. In the handheld mode, the user holds the reader in his or her hand at a certain working distance from the target to be imaged and initially aims the reader at the target. The user may first lift the reader from a countertop or like support surface, or from a support, such as a stand, a cradle, or a docking station. Once reading is completed, the user may return the reader to the countertop, or to the support, to resume hands-free operation.

Although the known imaging readers are generally satisfactory for their intended purpose, one concern relates to different formats used by different components. The imager is available as a monochrome or a color device. A monochrome imager generates an output data stream in a monochrome format and is generally preferred in a bar code symbol reading application, because, among other things, the monochrome imager generally has larger pixels and, thus, the monochrome imager has a better signal-to-noise ratio, as well as a better sensitivity to light due to the absence of color filters, as compared to color imagers. Although the controller is also available as a monochrome or a color device, most controllers used in modern computer equipment are configured as color controllers, which only accept output data streams from the imager in a color format.

The output data stream in the monochrome format has a plurality of pixel cells or slots, each containing pixel data indicative of the luminance, e.g., the intensity or brightness, of the captured return light detected by each pixel. The output data stream in the color format also has a plurality of pixel slots, but, in addition, also has a plurality of color cells or slots that contain color information, e.g., the blue difference chrominance ($C_b$), or the red difference chrominance ($C_r$), of the captured return light detected by each pixel. Since a color controller can only receive an output data stream in the color format, the absence of any color slots or color information in the monochrome format results in an incompatibility between these formats. The art has proposed addressing this incompatibility by using monochrome-to-color converter circuits, which add dummy cells or slots to the output data stream in the monochrome format, and which insert dummy data into these dummy slots. The dummy data do not contain any useful information relating to the image, but are merely provided to render the output data stream from the monochrome imager compatible with the color controller. The dummy data is discarded or ignored by the color controller.

Yet, the known converter circuits have not been altogether satisfactory for their intended purpose. The conversion process is very inefficient, particularly insofar as data bandwidth is concerned. The conversion process is also very slow, thereby rendering the reading performance sluggish.

Accordingly, there is a need for an apparatus for, and a method of, enhancing and optimizing target reading performance by converting a monochrome format of an output data stream from a monochrome imager to a color format required by a color controller without, among other things, using or relying on any such dummy data.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus for reading a target by image capture, in accordance with one feature of this invention, includes a housing, a window supported by the housing, and a solid-state monochrome imager, e.g., a CCD or a CMOS device, supported by the housing. The imager has an array of light sensors looking at a field of view that extends through the window to the target, and is operative for capturing return light from the target to be read. The imager generates an output data stream in a monochrome format having a plurality of cells or slots containing pixel data indicative of an image of the target. The apparatus includes a controller for controlling the monochrome imager. The controller has a color video input for receiving the output data stream in a color format different from the monochrome format. A converter circuit is operative for formatting the output data stream to have additional slots to convert the monochrome format into the color format, for receiving auxiliary pixel data related to the image of the target, for inserting the auxiliary pixel data into the additional slots, and for processing both the pixel data and the auxiliary pixel data to enhance the reading of the target.

The pixel data is luminance data indicative of intensities of the captured return light from the sensors. The additional slots are reserved color slots in the color format. In one embodiment, the controller assists in generating the auxiliary pixel data. In another embodiment, the controller controls the imager to produce another image of the target, in which case the auxiliary pixel data is indicative of the other image. In still another embodiment, the controller controls another monochrome imager to produce another image of the target, in which case the auxiliary pixel data is indicative of the other image. Thus, there is no dummy data as in the known art. Instead, the additional slots are used to contain useful information relating to the image. This expedites the decoding and reading of the target, and renders the performance of the apparatus more aggressive.

In accordance with another feature of this invention, a method of reading a target by image capture, is performed by capturing return light from the target to be read with an array of light sensors of a solid-state monochrome imager having a field of view that extends to the target, generating an output data stream in a monochrome format having a plurality of slots containing pixel data indicative of an image of the target, formatting the output data stream to have additional slots to convert the monochrome format into a color format different from the monochrome format, receiving auxiliary pixel data related to the image of the target, inserting the auxiliary pixel data into the additional slots, and processing both the pixel data and the auxiliary pixel data to generate the output data stream in the color format.

In accordance with still another feature of this invention, a scan engine is mounted in the above-described apparatus. The scan engine includes the above-described monochrome imager and the above-described converter circuit, which includes an input formatter for formatting the output data stream to have additional slots to convert the monochrome format into the color format, a buffer for receiving auxiliary pixel data related to the image of the target, and an output formatter for inserting the auxiliary pixel data from the buffer into the additional slots and for processing both the pixel data and the auxiliary pixel data to enhance the reading of the target. The above-described color controller is connected to the scan engine and receives the output data stream in the color format.

Figure 1:
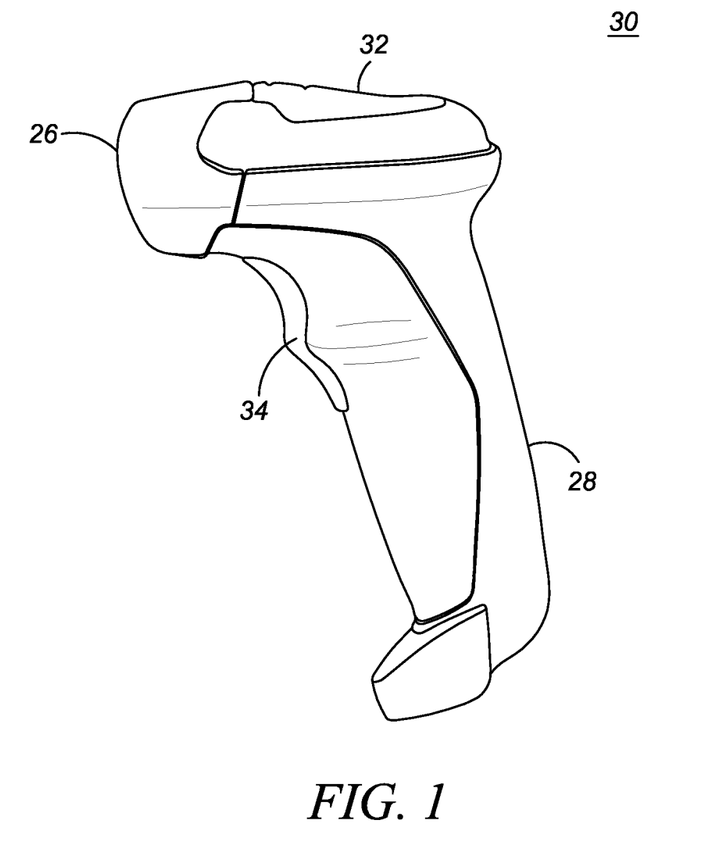
FIG. 1 is a side elevational view of an imaging reader operative, in either a handheld mode or a hands-free mode, for capturing images from targets to be electro-optically read.

Turning now to the drawings, reference numeral 30 in FIG. 1 generally identifies a cordless imaging reader ergonomically configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32. The imaging reader 30 is held by the handle 28 in an operator's hand and used in a handheld mode in which a trigger 34 is manually depressed to initiate imaging of targets, especially symbols and/or forms, to be read in a range of working distances relative to the window 26. The reader 30 could also be corded. When not held in the operator's hand, the reader 30 may be mounted on a support in a hands-free mode of operation. It will be understood that this invention is not intended to be limited to portable housings, because housings of other configurations, such as a flat bed scanner, or a vertical slot scanner, or a bi-optical workstation, could also be employed and benefit from the present invention.

Figure 2:
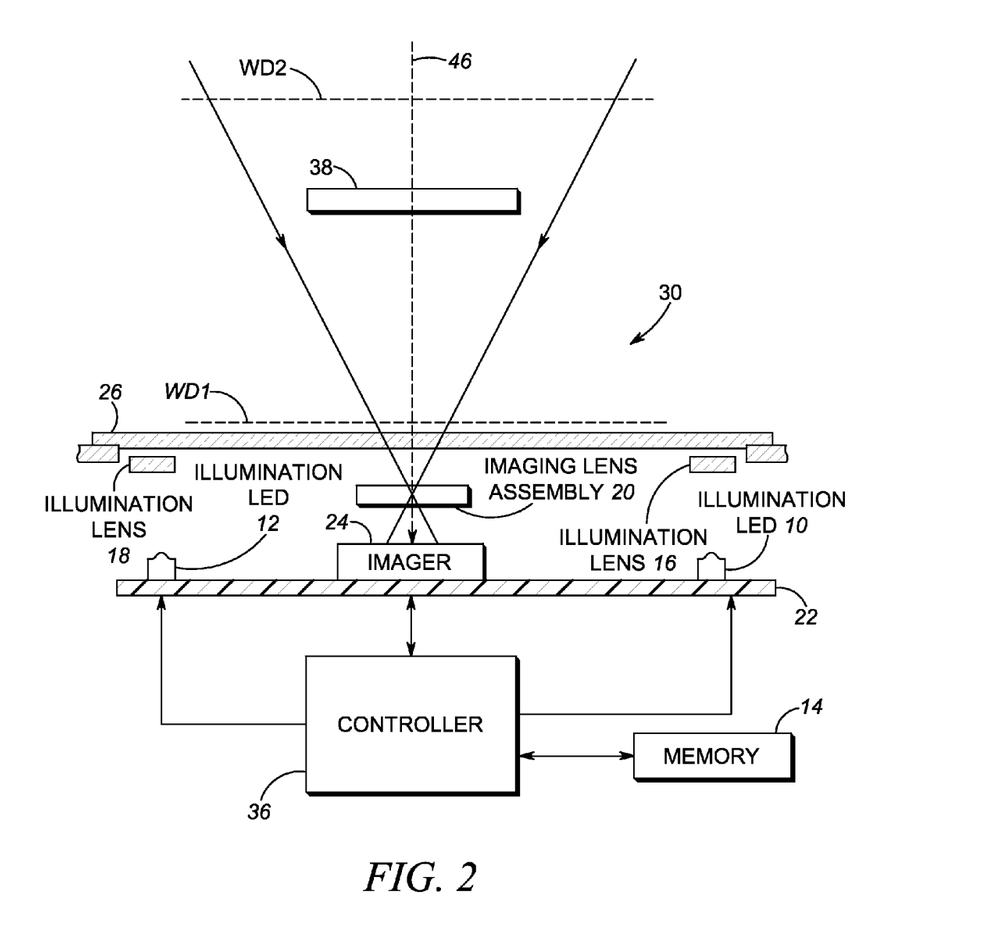
FIG. 2 is a schematic diagram of various components of the reader of FIG. 1.

As schematically shown in FIG. 2, an imaging system or data capture module includes an imager 24 (also known as an imaging sensor or camera) mounted on a printed circuit board (PCB) 22 in the reader 30. The imager 24 is a solid-state device, for example, a CCD or a CMOS imager, preferably having a two-dimensional array of addressable image sensors or pixels arranged in mutually orthogonal rows and columns, and operative for detecting return light captured by an imaging lens assembly 20 along an imaging axis 46 through the window 26. The return light is scattered and/or reflected from a target 38 over the field of view. The field of view is generally perpendicular to the imaging axis 46.

The imaging lens assembly 20 is part of the imaging system and is operative for focusing the return light onto the array of image sensors to enable the target 38 to be read. The target 38 may be located anywhere in a working range of distances between a close-in working distance (WD1) and a far-out working distance (WD2). In a preferred embodiment, WD1 is about one-half inch from the window 26, and WD2 is about thirty inches from the window 26.

An illuminating light assembly is optionally included in the data capture module and is mounted in the imaging reader. The illuminating light assembly includes an illumination light source, e.g., at least one light emitting diode (LED), and preferably a plurality of LEDs, such as a pair of LEDs 10, 12, and a pair of lenses 16, 18 configured to generate a substantially uniform distributed illumination pattern of light on and along the target 38 to be read by image capture. At least part of the scattered and/or reflected return light is derived from the illumination pattern of light on and along the target 38.

As shown in FIG. 2, the imager 24 and the LEDs 10, 12 are operatively connected to a controller or microprocessor 36 operative for controlling the operation of these components. A memory 14 is connected and accessible to the controller 36.

Preferably, the microprocessor is the same as the one used for processing the return light from the target 38.

In the handheld mode of operation, in response to actuation of the trigger 34, the microprocessor 36 sends a command signal to energize the LEDs 10, 12 for a short exposure time period, say 500 microseconds or less, and energizes and exposes the imager 24 to collect the return light, e.g., illumination light and/or ambient light, from the target 38 only during said exposure time period. In the hands-free mode of operation, the microprocessor 36 may either be free-running and continuously or intermittently send the aforementioned command signal, or the imager 24 may be employed to detect entry of the target 38 into the field of view and, in response to such target entry detection, the microprocessor 36 sends the aforementioned command signal.

Figure 3:
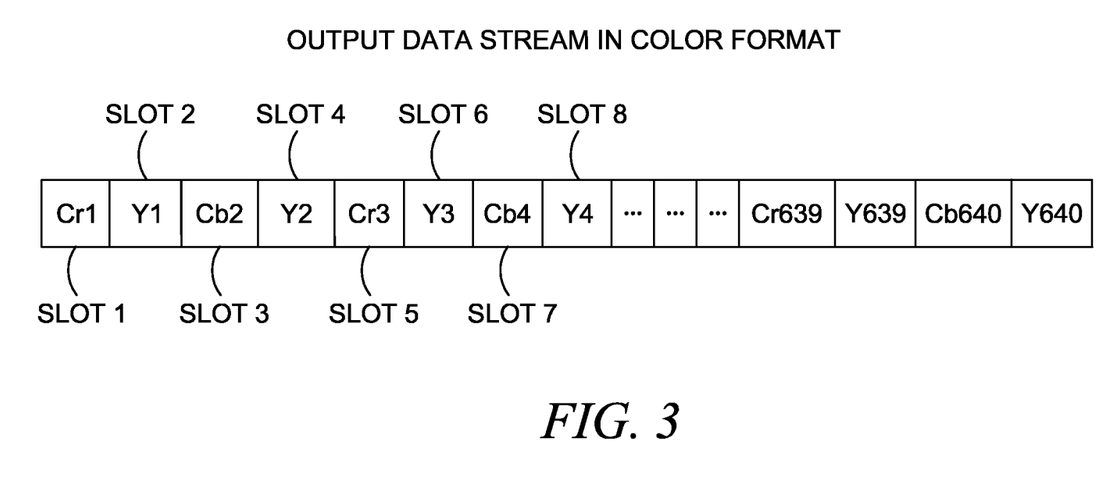
FIG. 3 is a representation of a data stream in a color format of one row of a captured image.

As described above, the controller 36, as best seen in FIG. 4, is a color controller having a color video input 60. The color controller 36 is programmed to receive an incoming output data stream in a color format at the color video input 60. One such color format using the $YC_bC_r$ or YUV model is depicted in FIG. 3, in which Y is the luminance, e.g., the intensity or brightness, of the captured return light detected by each pixel; $C_b$ is the blue difference chrominance; and $C_r$ is the red difference chrominance. The data stream illustrated in FIG. 3 has a plurality of cells or slots and is advantageously sampled at a rate of 4:2:2, and each slot contains one byte (8 bits). Only one row of an image whose resolution is 640 pixels×480 pixels is shown. Thus, for the illustrated row, slot 1 contains $C_r$ for the first pixel, slot 2 contains Y for the first pixel, slot 3 contains $C_b$ for the second pixel, slot 4 contains Y for the second pixel, and so on. Thus, the even-numbered slots are luminance slots containing luminance data indicative of an image of the target, whereas the odd-numbered slots are color slots containing chrominance data indicative of an image of the target. It will be understood, for the example given, that there will be 480 additional rows when the entire image is captured.

As also described above, the imager 24, as best seen in FIG. 4, is a monochrome imager having an output 62 from which an output data stream is outputted. In the known art, a color imager would have output a data stream in the color format shown in FIG. 3. However, the monochrome imager 24 has no color slots or chrominance data in the monochrome format. The known monochrome-to-color converter circuits added dummy cells or slots to the output data stream in the monochrome format in the same locations reserved for the color slots, and inserted dummy data into these dummy slots. Thus, all the odd-numbered slots in FIG. 3, which would have contained color information in the color format, instead contained dummy data, in order to provide compatibility. Since the dummy data did not contain any useful information relating to the image, bandwidth and reading performance suffered.

Figure 4:
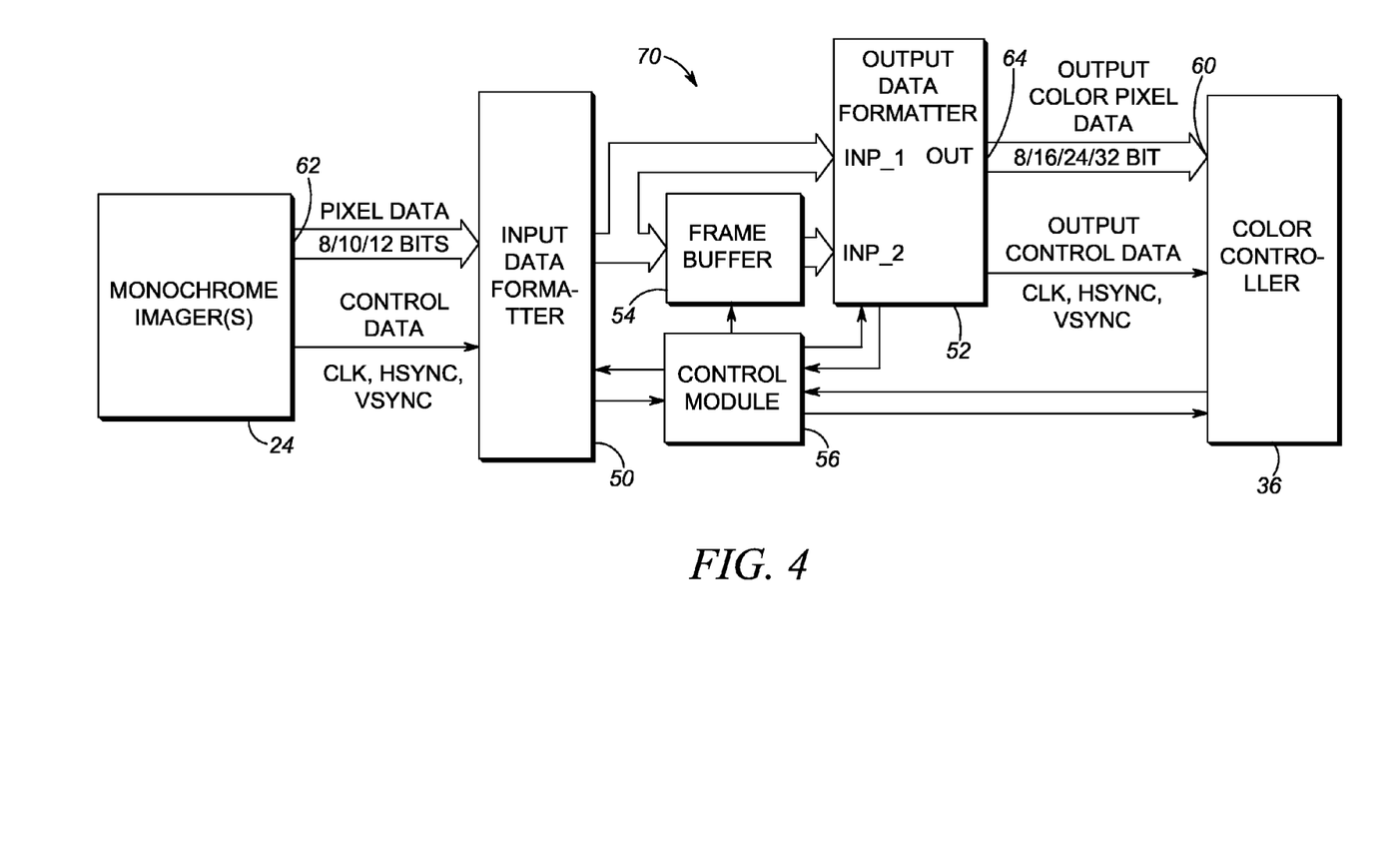
FIG. 4 is a block diagram of a converter circuit for use in the reader of FIG. 1 in accordance with this invention.

In accordance with this invention, a converter circuit 70, as shown in FIG. 4, is operative for formatting the output data stream outputted from the monochrome imager 24 at output 62 to have, in addition to a plurality of the luminance or pixel slots containing pixel data indicative of an image of the target 38, a plurality of additional cells or slots to convert the monochrome format into the color format. In FIG. 3, the pixel slots are the even-numbered slots, and the additional slots are the odd-numbered slots. The converter circuit 70 is also operative for receiving auxiliary pixel data related to the image of the target 38, for inserting the auxiliary pixel data into the additional slots, and for processing both the pixel data and the auxiliary pixel data to enhance the reading of the target 38. Thus, the auxiliary pixel data contains useful information about the image, which is in contrast to the dummy data of the known art which contained no useful data about the image.

More specifically, the converter circuit 70 includes an input formatter 50 for formatting the output data stream to have the additional slots, a buffer 54 for receiving the auxiliary pixel data, and an output formatter 52 for processing the auxiliary pixel data received from the buffer 54, together with the pixel data received from the input formatter 50. Currently available monochrome imagers 24 may output its data stream with slot capacities of 8, 10, or 12 bits. The input formatter 50 can accommodate any of these imagers 24 and preferably outputs a data stream with each slot having a 32 bit capacity to the buffer 54 and to a first input (INP_1) of the output formatter 52. The auxiliary pixel data in the buffer 54 is conducted to a second input (INP_2) of the output formatter 52. The output formatter 52 has an output 64 from which an output data stream with slot capacities of 8, 16, 24, or 32 bits in the color format is sent to the controller 36. A control module 56 is connected between the controller 36 and is connected to the input formatter 50, the buffer 54 and the output formatter 52. Control data, including a clock (CLK) signal, a horizontal synching (HSYNCH) signal, and a vertical synching (VSYNCH) signal is also conducted between the components.

The auxiliary pixel data in the buffer 54 can be obtained in various ways. For example, the controller 36 may be operated to remove imperfections, e.g., bright spots, the background, etc., from the image, by controlling the output formatter 52 to produce a filtered image of the target, in which case, the auxiliary pixel data is indicative of the filtered image. More specifically, the controller 36 is operative to issue a command via the control module 56 to the output formatter 52 to perform a filter function on the auxiliary pixel data stored in the buffer 54 prior to combining the pixel data and the filtered auxiliary pixel data together. As another example, the controller 36 may be operated to control the imager 24 to produce another image of the target 38, e.g., by taking a different exposure, or a different focus, in which case, the auxiliary pixel data is indicative of the other image. As still another example, the controller 36 may be operated to control another monochrome imager 24 to produce another image of the target 38, in which case, the auxiliary pixel data is indicative of the other image.

Figure 5:
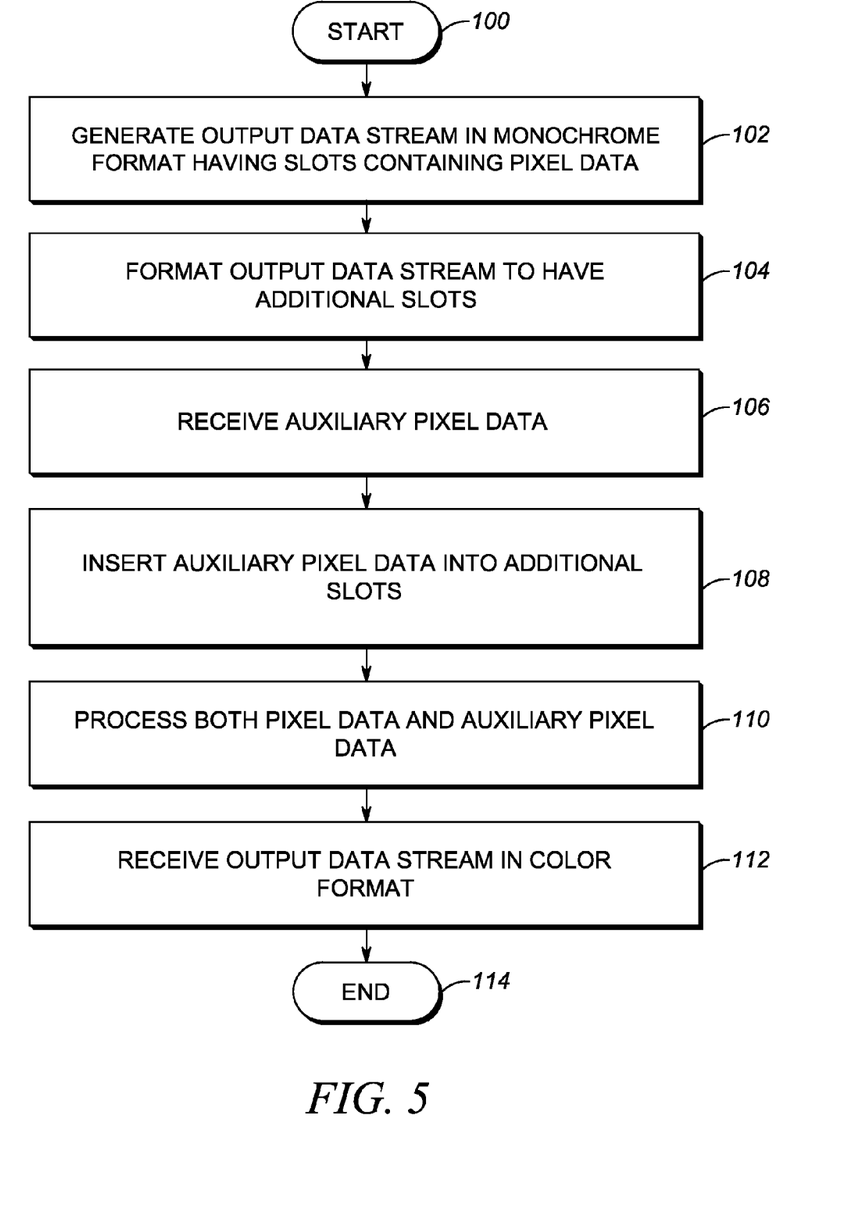
FIG. 5 is a flow chart depicting steps performed in accordance with the method of this invention.

As illustrated in the flow chart of FIG. 5, the method of reading a target by image capture is performed, beginning at start step 100, by capturing return light from the target 38 to be read with the array of light sensors of the solid-state monochrome imager 24 having a field of view that extends through the window 26 to the target 38, and generating an output data stream in a monochrome format having a plurality of slots containing pixel data indicative of an image of the target in step 102. Then, in step 104, the output data stream is formatted by the input formatter 50 to have additional slots to convert the monochrome format into a color format. Auxiliary pixel data related to the image of the target is received by the buffer 54 in step 106. Then, in step 108, the auxiliary pixel data is inserted into the additional slots, and both the pixel data and the auxiliary pixel data are processed by the output formatter 52 in step 110. The output data stream is received in the controller 36 in the color format in step 112. The method ends at step 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for reading a target by image capture, comprising:
   a housing;
   a window supported by the housing;
   a solid-state monochrome imager supported by the housing and having an array of light sensors looking at a field of view that extends through the window to the target, and operative for capturing return light from the target to be read, and for generating an output data stream in a monochrome format having a plurality of slots containing pixel data indicative of an image of the target;
   a controller for controlling the monochrome imager and having a color video input for receiving the output data stream in a color format different from the monochrome format; and
   a converter circuit for formatting the output data stream to have additional slots to convert the monochrome format into the color format, for receiving auxiliary pixel data related to the image of the target, for inserting the auxiliary pixel data into the additional slots, and for processing both the pixel data and the auxiliary pixel data to enhance the reading of the target.

2. The apparatus of claim 1, wherein the pixel data is luminance data indicative of intensities of the captured return light from the sensors.

3. The apparatus of claim 1, wherein the additional slots are reserved color slots in the color format.

4. The apparatus of claim 1, wherein the controller is operative for assisting in generating the auxiliary pixel data.

5. The apparatus of claim 1, wherein the controller is operative for controlling the imager to produce another image of the target; and wherein the auxiliary pixel data is indicative of the other image.

6. The apparatus of claim 1, wherein the controller is operative for controlling another monochrome imager to produce another image of the target; and wherein the auxiliary pixel data is indicative of the other image.

7. The apparatus of claim 1, wherein the converter circuit includes an input formatter for formatting the output data stream to have the additional slots, a buffer for receiving the auxiliary pixel data, and an output formatter for processing the auxiliary pixel data received from the buffer, together with the pixel data received from the input formatter.

8. A scan engine, comprising:
a solid-state monochrome imager operative for capturing return light from a target, and for generating an output data stream in a monochrome format having a plurality of slots containing pixel data indicative of an image of the target; and
a converter circuit for converting the monochrome format of the output data stream into a color format different from the monochrome format, the converter circuit including an input formatter for formatting the output data stream to have additional slots, a buffer for receiving auxiliary pixel data related to the image of the target, and an output formatter for inserting the auxiliary pixel data from the buffer into the additional slots and for processing both the pixel data and the auxiliary pixel data.

9. The scan engine of claim 8, wherein the monochrome imager generates the pixel data as luminance data indicative of intensities of the captured return light.

10. The scan engine of claim 8, wherein the input formatter formats the additional slots as reserved color slots in the color format.

11. The scan engine of claim 8, wherein the converter circuit includes a control module operative for assisting in generating the auxiliary pixel data.

12. The scan engine of claim 8, wherein the imager is controlled to produce another image of the target; and wherein the auxiliary pixel data is indicative of the other image.

13. The scan engine of claim 8, wherein another monochrome imager is controlled to produce another image of the target; and wherein the auxiliary pixel data is indicative of the other image.

14. The scan engine of claim 8, wherein the monochrome imager and the converter circuit are compact in size to enable the compact scan engine to be mounted in a housing having a window through which the return light is captured.

15. A method of reading a target by image capture, comprising:
capturing return light from the target to be read with an array of light sensors of a solid-state monochrome imager having a field of view that extends to the target, and generating an output data stream in a monochrome format having a plurality of slots containing pixel data indicative of an image of the target;
formatting the output data stream to have additional slots to convert the monochrome format into a color format different from the monochrome format;
receiving auxiliary pixel data related to the image of the target;
inserting the auxiliary pixel data into the additional slots; and
processing both the pixel data and the auxiliary pixel data to generate the output data stream in the color format.

16. The method of claim 15, and configuring the pixel data as luminance data indicative of intensities of the captured return light from the sensors.

17. The method of claim 15, and configuring the additional slots as reserved color slots in the color format.

18. The method of claim 15, and processing both the pixel data and the auxiliary pixel data with a control module that assists in generating the auxiliary pixel data.

19. The method of claim 15, and controlling the imager to produce another image of the target; and configuring the auxiliary pixel data to be indicative of the other image.

20. The method of claim 15, and controlling another monochrome imager to produce another image of the target; and configuring the auxiliary pixel data to be indicative of the other image.

* * * * *